(12) United States Patent
Wollrath et al.

(10) Patent No.: US 6,598,094 B1
(45) Date of Patent: Jul. 22, 2003

(54) METHOD AND APPARATUS FOR DETERMINING STATUS OF REMOTE OBJECTS IN A DISTRIBUTED SYSTEM

(75) Inventors: Ann M. Wollrath, Groton, MA (US); Peter C. Jones, Winchester, MA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 09/044,790

(22) Filed: Mar. 20, 1998

(51) Int. Cl.$^7$ .............................................. G06F 9/46
(52) U.S. Cl. ...................... 709/330; 709/315; 709/316; 709/318; 709/217
(58) Field of Search ................................ 709/315, 330, 709/310, 318, 317, 332, 200, 202, 201, 203, 217, 219; 707/103 R, 103 Z, 103 Y

(56) References Cited

U.S. PATENT DOCUMENTS

| 4,430,699 A | 2/1984 | Segarra et al. .............. 709/230 |
| 4,491,946 A | 1/1985 | Kryskow, Jr. et al. ....... 370/453 |

(List continued on next page.)

FOREIGN PATENT DOCUMENTS

| EP | 0 300 516 A | 1/1989 |
| EP | 0 351 536 A3 | 1/1990 |
| EP | 0 384 339 A | 8/1990 |
| EP | 0 472 874 A1 | 3/1992 |
| EP | 0 474 340 A | 3/1992 |
| EP | 497 022 A1 | 8/1992 |
| EP | 0 555 997 A | 8/1993 |
| EP | 0 565 849 A | 10/1993 |
| EP | 0 569 195 A3 | 11/1993 |
| EP | 0 625 750 A | 11/1994 |
| EP | 0 635 792 A | 1/1995 |
| EP | 0 651 328 A | 5/1995 |
| EP | 0 660 231 A2 | 6/1995 |
| EP | 0 697 655 A2 | 2/1996 |
| EP | 0 718 761 A1 | 6/1996 |
| EP | 0 767 432 A2 | 4/1997 |
| EP | 0 778 520 A2 | 6/1997 |
| EP | 0 794 493 A2 | 9/1997 |
| EP | 0 803 810 A2 | 10/1997 |
| EP | 0 803 811 A2 | 10/1997 |
| EP | 0 805 393 A2 | 11/1997 |
| EP | 0 810 524 A1 | 12/1997 |
| EP | 0 817 020 A2 | 1/1998 |
| EP | 0 817 022 A2 | 1/1998 |

(List continued on next page.)

OTHER PUBLICATIONS

Sun. "Java Remote Method Invocation Specification." Feb. 10, 1997.*
Hodges, Douglas. "Managing Object Lifetimes in OLE" Aug. 25, 1994. pp. 1–41.*

(List continued on next page.)

Primary Examiner—St. John Courtenay, III
Assistant Examiner—Lewis A. Bullock, Jr.
(74) Attorney, Agent, or Firm—Finnegan, Henderson, Farabow, Garrett & Dunner, L.L.P.

(57) ABSTRACT

Systems consistent with the present invention a method and apparatus is provided for selectively supplying a state change associated with remote objects in a distributed system. The method involves registering a request from a computational entity to receive notification as to a state change associated with a remote object. Registration of a notification request causes the creation of a remote weak reference to the remote object including an identifier of a location of the remote object. Periodically, a request is sent to a location based on the identifier of the remote weak reference. When it is determined that a state change associated with the remote object has occurred, the registered computational entity is notified accordingly.

8 Claims, 5 Drawing Sheets

U.S. PATENT DOCUMENTS

| | | | | |
|---|---|---|---|---|
| 4,558,413 | A | 12/1985 | Schmidt et al. | 707/203 |
| 4,713,806 | A | 12/1987 | Oberlander et al. | 370/358 |
| 4,809,160 | A | 2/1989 | Mahon et al. | 713/200 |
| 4,823,122 | A | 4/1989 | Mann et al. | 340/825.28 |
| 4,939,638 | A | 7/1990 | Stephenson et al. | 710/244 |
| 4,956,773 | A | 9/1990 | Saito et al. | 717/104 |
| 5,088,036 | A | 2/1992 | Ellis et al. | 395/425 |
| 5,109,486 | A | 4/1992 | Seymour | 395/200 |
| 5,187,787 | A | 2/1993 | Skeen et al. | 395/600 |
| 5,218,699 | A | 6/1993 | Brandle et al. | 709/328 |
| 5,257,369 | A | 10/1993 | Skeen et al. | 395/650 |
| 5,293,614 | A | 3/1994 | Ferguson et al. | 395/600 |
| 5,297,283 | A | 3/1994 | Kelly, Jr. et al. | 709/104 |
| 5,307,490 | A | 4/1994 | Davidson et al. | 709/328 |
| 5,311,591 | A | 5/1994 | Fischer | 713/156 |
| 5,339,435 | A | 8/1994 | Lubkin et al. | 717/121 |
| 5,386,568 | A | 1/1995 | Wold et al. | 717/162 |
| 5,390,328 | A | 2/1995 | Frey et al. | 395/650 |
| 5,392,280 | A | 2/1995 | Zheng | 370/353 |
| 5,423,042 | A | 6/1995 | Jalili et al. | 709/328 |
| 5,440,744 | A | 8/1995 | Jacobson et al. | 709/203 |
| 5,448,740 | A | 9/1995 | Kiri et al. | 717/155 |
| 5,452,459 | A | 9/1995 | Drury et al. | 707/3 |
| 5,455,952 | A | 10/1995 | Gjovaag | 717/108 |
| 5,471,629 | A | 11/1995 | Risch | 707/201 |
| 5,475,792 | A | 12/1995 | Stanford et al. | 704/223 |
| 5,475,817 | A | 12/1995 | Waldo et al. | 709/316 |
| 5,481,721 | A | 1/1996 | Serlet et al. | 709/315 |
| 5,504,921 | A | 4/1996 | Dev et al. | 709/223 |
| 5,511,196 | A | * 4/1996 | Shackelford et al. | 709/315 |
| 5,511,197 | A | 4/1996 | Hill et al. | 709/328 |
| 5,524,244 | A | 6/1996 | Robinson et al. | 717/14 D |
| 5,548,726 | A | 8/1996 | Pettus | 709/221 |
| 5,553,282 | A | 9/1996 | Parrish et al. | 707/10 |
| 5,555,367 | A | 9/1996 | Premerlani et al. | 707/4 |
| 5,555,427 | A | 9/1996 | Aoe et al. | 709/201 |
| 5,557,798 | A | 9/1996 | Skeen et al. | 395/650 |
| 5,560,003 | A | 9/1996 | Nilsen et al. | 395/600 |
| 5,561,785 | A | 10/1996 | Blandy et al. | 395/497.01 |
| 5,577,231 | A | 11/1996 | Scalzi et al. | 703/26 |
| 5,594,921 | A | 1/1997 | Pettus | 710/11 |
| 5,603,031 | A | 2/1997 | White et al. | 395/683 |
| 5,617,537 | A | 4/1997 | Yamada et al. | 709/214 |
| 5,628,005 | A | 5/1997 | Huvig | 707/8 |
| 5,640,564 | A | 6/1997 | Hamilton et al. | 709/315 |
| 5,644,768 | A | 7/1997 | Periwal et al. | 709/102 |
| 5,652,888 | A | 7/1997 | Burgess | 709/318 |
| 5,655,148 | A | 8/1997 | Richman et al. | 395/828 |
| 5,659,751 | A | 8/1997 | Heninger | 395/685 |
| 5,671,225 | A | 9/1997 | Hooper et al. | 370/468 |
| 5,675,796 | A | 10/1997 | Hodges et al. | 709/100 |
| 5,675,797 | A | 10/1997 | Chung et al. | 709/104 |
| 5,680,573 | A | 10/1997 | Rubin et al. | 711/129 |
| 5,680,617 | A | 10/1997 | Gough et al. | 707/104.1 |
| 5,684,955 | A | 11/1997 | Meyer et al. | 709/316 |
| 5,689,709 | A | 11/1997 | Corbett et al. | 709/315 |
| 5,706,435 | A | 1/1998 | Barbará et al. | 711/141 |
| 5,706,502 | A | 1/1998 | Foley et al. | 707/10 |
| 5,724,588 | A | 3/1998 | Hill et al. | 709/328 |
| 5,727,145 | A | 3/1998 | Nessett et al. | 713/200 |
| 5,737,607 | A | 4/1998 | Hamilton et al. | 709/316 |
| 5,745,678 | A | 4/1998 | Herzberg et al. | 713/200 |
| 5,745,695 | A | 4/1998 | Gilchrist et al. | 709/227 |
| 5,745,703 | A | 4/1998 | Cejtin et al. | 709/238 |
| 5,745,755 | A | 4/1998 | Covey | 707/203 |
| 5,748,897 | A | 5/1998 | Katiyar | 709/219 |
| 5,754,849 | A | 5/1998 | Dyer et al. | 707/101 |
| 5,757,925 | A | 5/1998 | Faybishenko | 709/203 |
| 5,758,344 | A | 5/1998 | Prasad et al. | 707/10 |
| 5,761,656 | A | 6/1998 | Ben-Shachar | 707/4 |
| 5,764,897 | A | 6/1998 | Khalidi | 709/201 |
| 5,768,532 | A | 6/1998 | Megerian | 709/245 |
| 5,774,551 | A | 6/1998 | Wu et al. | 713/155 |
| 5,778,187 | A | 7/1998 | Monteiro et al. | 709/231 |
| 5,778,228 | A | 7/1998 | Wei | 709/328 |
| 5,778,368 | A | 7/1998 | Hogan et al. | 707/10 |
| 5,784,560 | A | 7/1998 | Kingdon et al. | 709/201 |
| 5,787,425 | A | 7/1998 | Bigus | 707/6 |
| 5,787,431 | A | 7/1998 | Shaughnessy | 707/100 |
| 5,790,548 | A | 8/1998 | Sistanizadeh et al. | 370/401 |
| 5,802,367 | A | 9/1998 | Held et al. | 709/332 |
| 5,808,911 | A | 9/1998 | Tucker et al. | 709/316 |
| 5,809,507 | A | 9/1998 | Cavanaugh, III | 707/103 R |
| 5,812,819 | A | 9/1998 | Rodwin et al. | 703/23 |
| 5,813,013 | A | 9/1998 | Shakib et al. | 707/102 |
| 5,815,149 | A | 9/1998 | Mutschler, III et al. | 345/762 |
| 5,815,709 | A | 9/1998 | Waldo et al. | 712/300 |
| 5,815,711 | A | 9/1998 | Sakamoto et al. | 717/105 |
| 5,818,448 | A | 10/1998 | Katiyar | 709/203 |
| 5,829,022 | A | 10/1998 | Watanabe et al. | 711/118 |
| 5,832,219 | A | 11/1998 | Pettus | 709/203 |
| 5,832,529 | A | 11/1998 | Wollrath et al. | 707/206 |
| 5,832,593 | A | 11/1998 | Wurst et al. | 29/750 |
| 5,835,737 | A | 11/1998 | Sand et al. | 710/113 |
| 5,842,018 | A | 11/1998 | Atkinson et al. | 707/501.1 |
| 5,844,553 | A | 12/1998 | Hao et al. | 345/733 |
| 5,845,090 | A | 12/1998 | Collins, III et al. | 709/221 |
| 5,845,129 | A | 12/1998 | Wendorf et al. | 710/200 |
| 5,860,004 | A | 1/1999 | Fowlow et al. | 717/109 |
| 5,860,153 | A | 1/1999 | Matena et al. | 711/216 |
| 5,864,862 | A | 1/1999 | Kriens et al. | 707/103 R |
| 5,864,866 | A | 1/1999 | Henckel et al. | 707/103 R |
| 5,872,928 | A | 2/1999 | Lewis et al. | 709/222 |
| 5,872,973 | A | 2/1999 | Mitchell et al. | 709/332 |
| 5,875,335 | A | 2/1999 | Beard | 717/139 |
| 5,878,411 | A | 3/1999 | Burroughs et al. | 707/4 |
| 5,884,024 | A | 3/1999 | Lim et al. | 713/201 |
| 5,884,079 | A | 3/1999 | Furusawa | 717/109 |
| 5,887,134 | A | 3/1999 | Ebrahim | 709/200 |
| 5,889,951 | A | 3/1999 | Lombardi | 709/219 |
| 5,890,158 | A | 3/1999 | House et al. | 707/10 |
| 5,892,904 | A | 4/1999 | Atkinson et al. | 713/201 |
| 5,913,029 | A | 6/1999 | Shostak | 709/203 |
| 5,933,497 | A | 8/1999 | Beetcher et al. | 705/59 |
| 5,933,647 | A | 8/1999 | Aronberg et al. | 717/178 |
| 5,935,249 | A | 8/1999 | Stern et al. | 713/201 |
| 5,940,827 | A | 8/1999 | Hapner et al. | 707/8 |
| 5,944,793 | A | 8/1999 | Islam et al. | 709/220 |
| 5,946,485 | A | 8/1999 | Weeren et al. | 717/109 |
| 5,946,694 | A | 8/1999 | Copeland et al. | 707/103 R |
| 5,949,998 | A | 9/1999 | Fowlow et al. | 717/105 |
| 5,951,652 | A | 9/1999 | Ingrassia, Jr. et al. | 709/248 |
| 5,956,509 | A | 9/1999 | Kevner | 709/330 |
| 5,963,947 | A | 10/1999 | Ford et al. | 707/10 |
| 5,966,531 | A | 10/1999 | Skeen et al. | 709/315 |
| 5,969,967 | A | 10/1999 | Aahlad et al. | 700/2 |
| 5,974,201 | A | 10/1999 | Chang et al. | 382/305 |
| 5,978,484 | A | 11/1999 | Apperson et al. | 705/54 |
| 5,987,506 | A | 11/1999 | Carter et al. | 709/213 |
| 5,999,179 | A | 12/1999 | Kekic et al. | 345/734 |
| 5,999,988 | A | 12/1999 | Pelegri-Llopart et al. | 709/330 |
| 6,003,763 | A | 12/1999 | Gallagher et al. | 235/379 |
| 6,009,103 | A | 12/1999 | Woundy | 370/401 |
| 6,016,496 | A | 1/2000 | Roberson | 707/103 R |
| 6,016,516 | A | 1/2000 | Horikiri | 709/330 |
| 6,023,586 | A | 2/2000 | Gaisford et al. | 717/178 |
| 6,026,414 | A | 2/2000 | Anglin | 707/204 |
| 6,031,977 | A | 2/2000 | Pettus | 709/230 |
| 6,032,151 | A | 2/2000 | Arnold et al. | 707/103 R |
| 6,044,381 | A | 3/2000 | Boothby et al. | 707/201 |
| 6,052,761 | A | 4/2000 | Hornung et al. | 711/141 |

| | | | | |
|---|---|---|---|---|
| 6,058,383 A | 5/2000 | Narasimhalu et al. | ......... | 705/44 |
| 6,061,699 A | 5/2000 | DiCecco et al. | ............ | 707/513 |
| 6,061,713 A | 5/2000 | Bharadhwaj | ................ | 709/203 |
| 6,067,575 A | 5/2000 | McManis et al. | ........... | 709/313 |
| 6,085,255 A | 7/2000 | Vincent et al. | ............. | 709/238 |
| 6,108,346 A | 8/2000 | Doucette et al. | ............ | 370/450 |
| 6,134,603 A | 10/2000 | Jones et al. | ................. | 709/330 |
| 6,182,083 B1 | 1/2001 | Scheifler et al. | ......... | 707/103 R |
| 6,185,602 B1 | 2/2001 | Bayrakeri | .................... | 709/204 |
| 6,185,611 B1 | 2/2001 | Waldo et al. | ............... | 709/221 |
| 6,216,138 B1 | 4/2001 | Wells et al. | ................ | 707/502 |
| 6,226,746 B1 | 5/2001 | Scheifler | ..................... | 713/200 |
| 6,247,091 B1 | 6/2001 | Lovett | ........................ | 710/260 |
| 6,263,379 B1 | 7/2001 | Atkinson et al. | ........... | 709/332 |
| 6,282,295 B1 | 8/2001 | Young et al. | ............... | 380/286 |
| 6,282,568 B1 | 8/2001 | Sondur | ....................... | 709/223 |
| 6,339,783 B1 | 1/2002 | Horikiri | ...................... | 709/203 |

FOREIGN PATENT DOCUMENTS

| | | |
|---|---|---|
| EP | 0 817 025 A | 1/1998 |
| EP | 0 836 140 A2 | 4/1998 |
| GB | 2 253 079 A | 8/1992 |
| GB | 2 262 825 A | 6/1993 |
| GB | 2 305 087 A | 3/1997 |
| JP | 11-45187 | 2/1999 |
| WO | WO92/07335 | 4/1992 |
| WO | WO92/09948 | 6/1992 |
| WO | WO93/25962 A1 | 12/1993 |
| WO | WO94/03855 | 2/1994 |
| WO | WO96/03692 A | 2/1996 |
| WO | WO96/10787 | 4/1996 |
| WO | WO96/18947 | 6/1996 |
| WO | WO96/24099 | 8/1996 |
| WO | WO98/02814 | 1/1998 |
| WO | WO98/04971 | 2/1998 |

OTHER PUBLICATIONS

Aldrich et al., "Providing Easier Access to Remote Objects in Client–Server Systems," System Sciences, 1998, Proceedings of the 31st Hawaii Internat'l. Conference, Jan. 6–9, 1998, pp. 366–375.

Aldrich et al., "Providing Easier Access to Remote Objects in Distributed Systems," Calif. Institute of Technology, www.cs.caltech.edu%7Ejedi/paper/jedipaper.html, Nov. 21, 1997.

Burns et al., "An Analytical Study of Opportunistic Lease Renewal," Distributed Computing Systems, 21st International Conference, pp. 146–153, Apr. 2000.

Dollimore et al, "The Design of a System for Distributing Shared Objects," The Computer Journal, No. 6, Cambridge, GB, Dec. 1991.

Fleish et al., "High Performance Distributed Objects Using Distributed Shared Memory & Remote Method Invocation," System Sciences, 1998, Proceedings of the 31st Hawaii Internat'l. Conference, Jan. 6–9, 1998, pp. 574–578.

Gray et al., "Leases: An Efficient Fault–Tolerant Mechanism for Distributed File Cache Consistency," Proceedings of the 12th ACM Symposium on Operating Systems Principles, pp. 202–210, 1989.

Guyennet et al., "A New Consistency Protocol Implemented in the CAliF System," IEEE, 1094–7256/97, pp. 82–87, 1997.

Guyennet et al., "Distributed Shared Memory Layer for Cooperative Work Applications," IEEE, 0742–1303/97, pp. 72–78, 1997.

Hoshi et al., "Allocation of the Cross–Connect Function in Leased Circuit Networks," 1992, ICC'92, conference record, SUPERCOMM/ICC '92, A New World of Communications, IEEE International Conference, pp. 1408–1412.

IBM Technical Disclosure Bulletin, "Local Network Monitoring to Populate Access Agent Directory," vol. 36, No. 09A, pp. 403–405, Sep. 1993.

McGrath, "Discovery and Its Discontents: Discovery Protocols for Ubiquitous Computing," Presented at Center for Excellence in Space Data and Information Science, NASA Goddard Space Flight Center, Apr. 5, 2000.

MUX–Elektronik, Java 1.1 Interactive Course, www.Ils.se/~mux/javaic.html, 1995.

Stevenson, "Token–Based Consistency of Replicated Servers," IEEE, CH2686–4/89/0000/0179, pp. 179–183, 1989.

Venners, "Jini Technology, Out of the Box," JAVAWORLD, 'Online!, pp. 1–4, Dec. 1998.

Yin et al., "Using Leases to Support Server Driven Consistency in Large–Scale Systems," Computer Services Department, University of Texas at Austin, p. 285–294, May 26–28, 1998.

Yin et al., "Volume Leases for Consistency in Large–Scale Systems," IEEE Transactions on Knowledge & Data Engineering, vol. 11, No. 4, pp. 563–576, Jul./Aug. 1999.

Birrell et al., *Implementing Remote Procedure Calls*, ACM Transactions on Computer Systems, vol. 2, No. 1, Feb. 1984, pp. 35–59.

Wilson, P.R., et al., "Design of the Opportunistic Garbage Collector," Proceedings of the Object Oriented Programming Systems Languages, An Applications Conference, New Orleans, vol. 24, No. 10, Oct. 1989.

Alexander, et al., "Active Bridging", Proceedings of the ACM/SIGCOMM'97 Conference, Cannes, France, 9/97.

Anonymous: "Change–Notification Service for Shared Files", IBM Technical Disclosure Bulletin, vol. 36, No. 8, pp. 77–82, Aug. 1993, XP002108713, New York, US.

Anonymous: "Resource Preemption for Priority Scheduling." Nov. 1973. IBM Technical Disclosure Bulletin, vol. 16, No. 6, p. 1931 XP002109435 New York, US.

Beech et al., "Object Databases as Generalizations of Relational Databases," Computer Standards & Interfaces, vol. 13, Nos. 1/3, pp. 221–230, (Jan. 1991) Amsterdam, NL.

Bertino et al., "Object–Oriented Database Management Systems: Concepts and Issues," Computer, vol. 24, No. 4, pp. 33–47, (Apr. 1991), Los Alamitos, CA.

Betz, Mark; "Interoperable objects: laying the foundation for distributed object computing"; Dr. Dobb's Journal, vol. 19, No. 11, p. 18(13); (Oct. 1994).

Bevan, D.I., "An Efficient Reference Counting Solution To The Disributed Garbage Collection Problem", Parall Computing, NL, Elsevier Publishers, Amsterdam, vol. 9, No. 2, pp. 179–192, Jan. 1989.

Dave A et al: "Proxies, Application Interface, And Distributed Systems", Proceedings International Workshop On Object Orientation In Operating Systems, Sep. 24, 1992, pp. 212–220.

Deux O et al: "The O2 System" Communications Of The Association For Computing Machinery, vol. 34, No. 10, Oct. 1, 1991, pp. 34–48.

Drexler, K. Eric, et al., "Incentive Engineering for Computational Resource Management," The Ecology of Computation, Elsevier Science Publishers B.V., 1988, pp. 231–266.

Droms, R., "RFC 1541 Dynamic Host Configuration Protocol", HTTP://WWW.CIS.OHIO-STATE.EDU/HTBIN/RFC/RFC1541.HTML, Oct. 1993, pp. 1–33.

Emms J: "A Definition Of An Access Control Systems Language" Computer Standards And Interfaces, vol. 6, No. 4, Jan. 1, 1987, pp. 443–454.

Gottlob et al., "Extending Object–Oriented Systems with Roles," ACM Transactions on information systems, vol. 14, No. 3, pp. 268–296 (Jul. 1996).

Guth, Rob: "JavaOne: Sun to Expand Java Distributed Computing Effort", "HTTP://WWW.SUNWORLD.COM/SWOL–02–1998/SWOL–02–SUNSPOTS.HTML," XP–002109935, P.1, Feb. 20, 1998.

Hamilton et al, "Subcontract: a flexible base for distributed programming"; Proceedings of 14th Symposium of Operating System Principles; (Dec. 1993).

Hartman, J., Manber, U., et al., Liquid Software: A new paradigm for networked systems, Technical Report 96–11, Dep. of Comp. Sci., Univ. of Arizona, 6/96.

Hunt, N., "IDF: A Graphical Data Flow Programming Language for Image Processing and Computer Vision", Proceedings of the International Conference on Systems, Man, and Cybernetics, Los Angeles, Nov. 4–7, pp. 351–360, (1990).

IBM (TM) Technical Disclosure Bulletin, "Object Location Algorithm," vol. 36, No. 09B, pp. 257–258, Sep. 1993.

IBM (TM) Technical Disclosure Bulletin, "Retrieval of Qualified Variables Using Extendible Hashing," vol. 36, No. 12, pp. 301–303, Dec. 1993.

IBM: "Chapter 6—Distributed SOM (DSOM)" Somobjects Developer Toolkit Users Guide, Version 2.1, Oct. 1994 (1994–10), pp. 6–1–6–90.

Kay, Michael H. et al., "An Overview of the Raleigh Object–Oriented Database System", ICL Technical Journal, vol. 7, No. 4, pp. 780–798, (Nov. 1991), Oxford, GB.

Kougiouris et al.; "Support for Space Efficient Object Invocation in Spring"; (Sep. 1994).

Mitchell et al.; "An Overview of the Spring System"; (Feb. 1994).

Orfali R. et al., "The Essential Distributed Objects Survival Guide," Chapter 11: Corba Commercial ORBs, pp. 203–215, John Wiley & Sons, Inc., (1996).

Riggs Roger et al., "Pickling State in the Java (TM) System," USENIX Association Conference on Object–Oriented Technologies and Systems, XP–0022112719, Jun. 17–21, 1996, pp. 241–250.

Rosenberry et al., "Understanding DCE"; Chapters 1–3, 6; (1992).

Wu, Xuequn, "A Type system for an Object–Oriented Database System," Proceedings of the International Computer Software and Applications Conference (COMPSAC), pp. 333–338, Sep. 11–13, 1991, Tokyo, JAPAN.

Yemini, Y. and S. da silva, "Towards Programmable Networks", IFIP/IEEE International Workshop on Distributed Systems: Operations and Management, L'Aquila, Italy, 10/96.

Mullender, *Distributed Systems*, Second Edition, Addison–Wesley, 1993.

Howard et al., *Scale and Performance in a Distributed File System*, ACM Transactions on Computer Systems, vol. 6, No. 1, Feb. 1988, pp. 51–81.

Dijkstra, *Self–stabilizing Systems in Spite of Distributed Control*Communications of the ACM, vol. 17, No. 11, Nov. 1974, pp. 643–644.

Ousterhout et al., *The Sprite Network Operating System*, Computer, IEEE, Feb. 1988, pp. 23–36.

Dourish, *A Divergence–Based Model of Synchrony and Distribution in Collaborative Systems*, Xerox Technical Report EPC–1194–102, 1994, pp. 1–10.

Birrell et al., *Grapevine: An Exercise in Distributed Computing*, Communications of the ACM, vol. 25, No. 4, Apr. 1982, pp. 260–274.

Gray et al., *Leases: An Efficient Fault–Tolerant Mechanism for Distributed File Cache Consistency*, ACM, 1989, pp. 202–210.

Lamport et al., *The Byzantine Generals Problem*, ACM Transactions on Programming Languages and Systems, vol. 4, No. 3, Jul. 1982, pp. 382–401.

Dolev et al., *On the Miniminal Synchronism Needed for Distributed Consensus*, Journal of the ACM, vol. 34, No. 1, Jan. 1987, pp. 77–97.

Liskov et al., *Distributed Object Management in Thor*, International Workshop on Distributed Object Management, 1992, p. 12.

Birrell et al., *Distributed Garbage Collection for Network Objects*, DEC SRC Research Report 116, Dec. 15, 1993.

Thompson, *Regular Expression Search Algorithm*, Communications of the ACM, vol. II, No. 6, p. 149 et seq., Jun. 1968.

*Remote Method Invocation Specifications*, Sun Microsystems, Inc., (1997), http://java.sun.com/products/jdk/1.1/docs/guide/rmi/spec/rmiTOC.doc.html.

"Eden Project Proposal," Department of Computer Science, University of Washington, Oct. 1980, Technical Report #80–10–01, cover and Foreword.

Almes et al., "Edmas: A Locally Distributed Mail System," Department of Computer Science, University of Washington, Technical Report 83–07–01, Jul. 7, 1983, Abstract & pp. 1–17.

Almes et al., "Research in Integrated Disributed Computing," Department of Computer Science, University of Washington, Oct. 1979, pp. 1–42.

Almes et al., "The Eden System: A Technical Review," Department of Computer Science, University of Washington, Technical Report 83–10–05, Oct. 1983, pp. 1–25.

Almes, "Integration and Distribution in the Eden System," Department of Computer Science, University of Washington, Technical Report 83–01–02, Jan. 19, 1983, pp. 1–18 & Abstract.

Almes, "The Evolution of the Eden Invocation Mechanism," Department of Computer Science, University of Washington, Technical Report 83–01–03, Jan. 19, 1983, pp. 1–14 & Abstract.

Arnold, Ken, "The Jini Architecture: Dynamic Services in a Flexible Network," Sun Microsystems, Inc., Proceedings of the 36th ACM IEEE Design Automation Conference, Jun. 1999, pp. 157–162.

Begole et al., "Transparent Sharing of Java Applets: A Replicated Approach," Oct. 1997, pp. 55–65.

Black et al., "A Language for Distributed Programming," Department of Computer Science, University of Washington, Technical Report 86–02–03, Feb. 1986, p. 10.

Black et al., "Distribution and Abstract Types in Emerald," University of Washington, Technical Report No. 85–08–05, Aug. 1985, pp. 1–10.

Black et al., "Object Structure in the Emerald System," University of Washington, Technical Report 86–04–03, Apr. 1986, pp. 1–14.

Black et al., "The Eden Project: A Final Report," Department of Computer Science, University of Washington, Technical Report 86–11–01, Nov. 1986, pp. 1–28.

Black, "Supporting Distributed Applications: Experience with Eden," Department of Computer Science, University of Washington, Technical Report 85–03–02, Mar. 1985, pp. 1–21.

Black, "The Eden Programming Language," Department of Computer Science, FR–35, University of Washington, Technical Report 85–09–01, Sep. 1985 (Revised Dec. 1985), pp. 1–19.

Black, "The Eden Project: Overview and Experiences," Department of Computer Science, University of Washington, EUUG, Autumn '86 Conference Proceedings, Manchester, UK, Sep. 22–25, 1986, pp. 177–189.

Braine et al., "Object–Flow," 1997, pp. 418–419.

Ciancarini et al., "Coordinating Distributed Applets with Shade/Java," Feb. 1998 pp. 130–138.

Delcambre et al., "Simulation of the Object Flow Model: A Conceptual Model: A Conceptual Modeling Language for Object–Driven Applications," 1993, pp. 216–225.

Goldberg et al., "Smalltalk–80—The Language and its Implementation," Xerox Palo Alto Research Center, 1983 (reprinted with corrections, Jul. 1985), pp. 1–720.

Holman et al., "The Eden Shared Calendar System," Department of Computer Science, FR–35, University of Washington, Technical Report 85–05–02, Jun. 22, 1985, pp. 1–14.

Hsu, "Reimplementing Remote Procedure Calls," University of Washington, Thesis, Mar. 22, 1985, pp. 1–106.

Hutchinson, "Emerald: An Object–Based Language for Distributed Programming," a Dissertation, University of Washington, 1987, pp. 1–107.

Jacob, "The Use of Distributed Objects and Dynamic Interfaces in a Wide–Area Transaction Environment," SIGCOMMn '95 Workshop on Middleware: Cambridge, Mass., Aug. 1995, pp. 1–3.

Jul et al., "Fine–Grained Mobility in the Emerald System," University of Washington, ACM Transactions on Computer Systems, vol. 6, No. 1, Feb. 1988, pp. 109–133.

Jul, "Object Mobility in a Distributed Object–Oriented System," a Dissertation, University of Washington, 1989, pp. 1–154 ( 1 page Vita).

Koshizuka et al., "Widow Real–Objects: A Distributed Shared Memory for Distributed Implementation of GUI Applications," Nov. 1993, pp. 237–247.

Krasner et al., "Smalltalk–80: Bits of History, Words of Advice," Xerox Corporation, pp. 1–344.

Lavana et al., "Executable Workflows: A Paradigm for Collaborative Design on the Internet," Jun. 1997, 6 pages.

Proceedings of the Eighth Symposium on Operating Systems Principles, Dec. 14–16, 1981, ACM, Special Interest Group on Operating Systems, Association for Computing Machinery, vol. 15, No. 5, Dec. 1981, ACM Order No. 534810.

Proudfoot, "Replects: Data Replication in the Eden System," Department of Computer Science, University of Washington, Technical Report No. TR–85–12–04, Dec. 1985, pp. 1–156.

Pu, "Replication and Nested Transaction in the Eden Distributed System," Doctoral Dissertation, University of Washington, Aug. 6, 1986, pp. 1–179 (1 page Vita).

Trehan et al., "Toolkit for Shared Hypermedia on a Distributed Object Oriented Architecture," 1993, pp. 1–8.

Jim Waldo et al., "Events in an RPC Based Distributed System," Proceedings of the 1995 USENIX Technical Conference, New Orleans, LA, pp. 131–142 (Jan. 16–20, 1995).

* cited by examiner

METHOD AND APPARATUS FOR DETERMINING STATUS OF REMOTE OBJECTS IN A DISTRIBUTED SYSTEM

RELATED APPLICATIONS

The following identified U.S. patent applications are relied upon and are incorporated by reference in this application.

Provisional U.S. Patent Application No. 60/076,048, entitled "Distributed Computing System," filed on Feb. 26, 1998.

U.S. patent application Ser. No. 09/044,923, entitled "Method and System for Leasing Storage," and filed on the same date herewith.

U.S. patent application Ser. No 09/044,838, entitled "Method, Apparatus, and Product for Leasing of Delegation Certificates in a Distributed System," and filed on the same date herewith.

U.S. patent application Ser. No. 09/044,834, entitled "Method, Apparatus and Product for Leasing of Group Membership in a Distributed System," and filed on the same date herewith.

U.S. patent application Ser. No. 09/044,916, entitled "Leasing for Failure Detection," and filed on the same date herewith.

U.S. patent application Ser. No. 09/044,938, entitled "Method for Transporting Behavior in Event Based System," and filed on the same date herewith.

U.S. patent application Ser. No. 09/044,919, entitled "Deferred Reconstruction of Objects and Remote Loading for Event Notification in a Distributed System," and filed on the same date herewith.

U.S. patent application Ser. No. 09/044,938, entitled "Methods and Apparatus for Remote Method Invocation," and filed on the same date herewith.

U.S. patent application Ser. No. 09/045,652, entitled "Method and System for Deterministic Hashes to Identify Remote Methods," and filed on the same date herewith.

U.S. patent application Ser. No. 09/044,930, entitled "Downloadable Smart Proxies for Performing Processing Associated with a Remote Procedure Call in a Distributed System," and filed on the same date herewith.

U.S. patent application Ser. No. 09/044,917, entitled "Suspension and Continuation of Remote Methods," and filed on the same date herewith.

U.S. patent application Ser. No. 09/044,835, entitled "Method and System for Multi-Entry and Multi-Template Matching in a Database," and filed on the same date herewith.

U.S. patent application Ser. No. 09/044,839, entitled "Method and System for In-Place Modifications in a Database," and filed on the same date herewith.

U.S. patent application Ser. No. 09/044,945, entitled "Method and System for Typesafe Attribute Matching in a Database," and filed on the same date herewith.

U.S. patent application Ser. No. 09/044,951, entitled "Dynamic Lookup Service in a Distributed System," and filed on the same date herewith.

U.S. patent application Ser. No. 09/044,959, entitled "Apparatus and Method for Providing Downloadable Code for Use in Communicating with a Device in a Distributed System," and filed on the same date herewith.

U.S. patent application Ser. No. 09/044,826, entitled "Method and System for Facilitating Access to a Lookup Service," and filed on the same date herewith.

U.S. patent application Ser. No. 09/044,932, entitled "Apparatus and Method for Dynamically Verifying Information in a Distributed System," and filed on the same date herewith.

U.S. patent application Ser. No. 09/030,840, entitled "Method and Apparatus for Dynamic Distributed Computing Over a Network," and filed on Feb. 26, 1998.

U.S. patent application Ser. No. 09/044,936, entitled "An Interactive Design Tool for Persistent Shared Memory Spaces," and filed on the same date herewith.

U.S. patent application Ser. No. 09/044,934, entitled "Polymorphic Token-Based Control," and filed on the same date U.S. patent application Ser. No. 09/044,915, entitled "Stack-Based Access Control," and filed on the same date herewith.

U.S. patent application Ser. No. 09/044,944, entitled "Stack-Based Security Requirements," and filed on the same date herewith.

U. S. patent application Ser. No. 09/044,837, entitled "Per-Method Designation of Security Requirements," and filed on the same date herewith.

BACKGROUND OF THE INVENTION

A. Field of the Invention

This invention generally relates to distributed systems and, more particularly, to a method and apparatus for determining a state of remote objects in a distributed system.

B. Description of the Related Art

Distributed systems typically comprise multiple machines, such as computers and related peripheral devices, connected in a network, for example, a Local Area Network (LAN), Wide Area Network (WAN), or the Internet. Distributed systems generally require that computational entities (e.g., applications, programs, applets, etc.) running in different address spaces, potentially on different machines, be able to communicate.

For a basic communication mechanism, distributed object-oriented systems utilize Remote Method Invocation (RMI), which is more generally known as Remote Procedure Call (RPC). RMI facilitates application-level communication between "objects" residing in different address spaces.

In object-oriented systems, a "class" provides a "template" for the creation of "objects" (which represent items or instances manipulated by the system) having characteristics of that class. The term "template" denotes that the objects (i.e., data items) in each class, share certain characteristics or attributes determined by the class. Objects are typically created dynamically during system operation. Methods associated with a class are generally invoked (i.e., caused to operate) on the objects of the same class.

RMI is the action of invoking a method of a remote object. In response to the invocation of a method on a remote object using RMI, a lower level communications process causes the invoked method to be executed on the remote object.

The Java™ runtime system, which is designed to implement applications written in the Java™ object-oriented programming language, supports a specific Java™ RMI Application Program Interface (API). This API is explained in, for example, a document entitled "Remote Method Invocation Specification," Sun Microsystems, Inc. (1997), which is available via universal resource locator (URL) http://java.sun.com/products/jdk/1.1/docs/guide/rmi/spec/ rmiTOC.doc.html, and is incorporated herein by reference. The Java language is described in many texts, including one that is entitled "The Java Language Specification" by James Gosling, Bill Joy, and Guy Steele, Addison-Wesley, 1996. Java and all Java-based trademarks are trademarks or registered trademarks of Sun Microsystems, Inc. in the United States and other countries.

Java RMI assumes a homogeneous environment of the Java runtime system, and therefore Java RMI takes advantage of the object model for the Java language whenever possible. In the Java™ distributed object model, a remote object is one whose methods can be invoked from another Java runtime system, potentially on a different machine. A remote object is defined by one or more remote interfaces written in the Java language that specify the methods of the remote object. For example, interfaces enable entities invoking methods on remote objects to define the methods supported by the remote objects without specifying the implementation of those methods.

"Garbage collection" is the term used in technical literature and the relevant arts to refer to a class of algorithms utilized to carry out storage management, specifically automatic memory reclamation. There are many known garbage collection algorithms, including reference counting, mark-sweep, and generational garbage collection algorithms. These, and other garbage collection techniques, are described in detail in a book entitled "Garbage Collection, Algorithms For Automatic Dynamic Memory Management" by Richard Jones and Raphael tins, John Wiley & Sons, 1996.

Distributed garbage collection extends the notion of garbage collection to the realm of distributed computing systems, reclaiming resources when no application on any computer in a distributed system refers to them. An automated distributed garbage collection process frees the programmer from determining when it is safe to delete a remote object. In the absence of a distributed garbage collector (DGC), a remote object would need to keep track of all clients that refer to the object and the object storage can be reclaimed when all clients no longer reference that object. For this function, Java RMI's DGC relies on a reference-counting garbage collection algorithm similar to Modula-3's Network Objects. See "Network Objects" by Birrell, Nelson, and Owicki, Digital Equipment Corporation Systems Research Center Technical Report 115, 1994.

To accomplish reference-counting garbage collection, the Java RMI runtime system, which is an implementation of Java RMI on top of the Java runtime system, keeps track of all remote objects referenced by computational entities (i.e., clients) executing through a local virtual machine (VM). The Java™ VM (JVM) is an abstract computing machine of the runtime system that receives instructions from programs in the form of bytecodes and that interprets these bytecodes by dynamically converting them into a form for execution, such as object code, and executing them. The JVM is described in detail in a text entitled "The Java Virtual Machine Specification", by Tim Lindholm and Frank Yellin, Addison Wesley, 1996.

When a computational entity references a remote object, the local RMI runtime for the computational entity increments a corresponding reference count. Such a reference is typically referred to as a "strong" reference, and the computational entity is said to "hold" a strong reference to the remote object. A strong reference is one that will prevent the (remote) object from being collected. The first reference to a remote object causes the runtime system to send a "referenced" message to the RMI runtime for that object (e.g., another machine in the distributed system holding the referenced object). As remote objects are found to be unreferenced in the local VM, the local RMI runtime decrements the corresponding reference count.

When the local VM discards the last reference to a remote object, an "unreferenced" message is sent to the RMI runtime corresponding to that object. When a remote object is not referenced by any client, the RMI runtime system for the remote object refers to its "local" object (which was considered a remote object for the client) using a weak reference. The weak reference allows the remote object's garbage collector to discard the object, provided no other local "strong" references to the object exist. As in the normal object life-cycle, a finalization process is called after the garbage collector determines that no more strong references to the object exist. One type of finalization process causes the memory allocated for an object to be returned to a memory heap for reuse. As long as a local "strong" reference to a remote object exists, it cannot be reclaimed in this way by a garbage collector and it can be passed in remote calls or returned to clients. Passing a remote object adds the identifier for the VM to which it was passed to the referenced set. As a result of the "referenced" call from the receiving VM, the RMI runtime will keep a "strong" reference to the remote object to prevent collection.

A remote object needing "unreferenced" notification, i.e., a notification that no more clients hold references, must implement a special interface referred to as the "java.rmi.server.Unreferenced" interface. In this manner, when all references to the object from remote entities (e.g., former clients of the object) no longer exist, a method named "unreferenced" of the object will be invoked. The unreferenced method is called when the set of references for the object becomes empty.

Note that if a network partition exists between a client and a remote object, it is possible that premature collection of the remote object will occur since the transport might believe that the client crashed. Because of the possibility of premature collection, remote references cannot guarantee referential integrity; in other words, it is always possible that a remote reference may in fact not refer to an existing object. An attempt to use such a reference will generate a RemoteException error which must be handled by the computational entity making use of the reference.

Accordingly, there is a need for a system that enables computational entities to determine the state of remote objects. By obtaining such state information, computational entities can better manage references to remote objects and avoid unwanted RemoteExceptions without preventing the remote objects from being garbage collected.

SUMMARY OF THE INVENTION

Systems consistent with the present invention, as embodied and broadly described herein, a method is provided for selectively supplying a state change associated with remote objects in a distributed system. The method involves registering a request from a computational entity to receive notification as to a state change associated with a remote object. Registration of a notification request causes the creation of a remote weak reference to the remote object including an identifier of a location of the remote object.

Periodically, a request is sent to a location based on the identifier of the remote weak reference. When it is determined that a state change associated with the remote object has occurred, the registered computational entity is notified accordingly.

BRIEF DESCRIPTION OF THE DRAWINGS

The accompanying drawings, which are incorporated in and constitute a part of this specification, illustrate an implementation of the invention and, together with the description, serve to explain the advantages and principles of the invention. In the drawings.

DETAILED DESCRIPTION

Reference will now be made in detail to an implementation consistent with the present invention as illustrated in the accompanying drawings. Wherever possible, the same reference numbers will be used throughout the drawings and the following description to refer to the same or like parts.

Introduction

Systems consistent with the present invention address shortcomings of the prior art and provide a method and apparatus for selectively supplying a state change associated with remote objects in a distributed system. The term "remote" is used herein to distinguish between an object located in an address space designated for a machine (such as a VM) operating in connection with a computational entity and an object located in an address space that is different from the address space designated for a machine operating in connection with the computational entity, the latter situation presenting a "remote" object. Consequently, an object located on the same physical machine as a computational entity can be considered a "remote" object with respect to that entity provided the computational entity uses an address space different from the space holding the object.

In general, a method and apparatus consistent with the present invention registers requests from computational entities to receive notification as to a "liveness" associated with remote objects. The term "liveness" is used herein to refer to whether a remote object is accessible at a specific time. A remote object is determined to be inaccessible when, for example, either a network partition prevents a computational entity from accessing the remote object or the remote object has been garbage collected. Such a partition can occur as a result of a communication problem with the computational entity's machine that prevents it from accessing the machine associated with the remote object or a communication problem associated with the remote object's machine.

More specifically, when a computational entity references a remote object, the entity maintains a strong reference to the-remote object. The computational entity may also register with the RMI runtime system to receive notification as to a change in the "liveness" of the remote object. Such a registration involves a registration-notification process of the RMI runtime system and causes the creation of a "remote weak reference," which is a reference to the remote object derived from the strong reference. The remote weak reference for the remote object will not prevent the remote object from being collected.

Based on a set of remote weak references, the RMI runtime system periodically sends status requests to machines associated with the corresponding remote objects. One or more of the responses to the requests are then provided to registered computational entities based on a change (if any) to the state of the remote object, i.e., the "liveness" of the remote object.

The Distributed System

Figure 1:
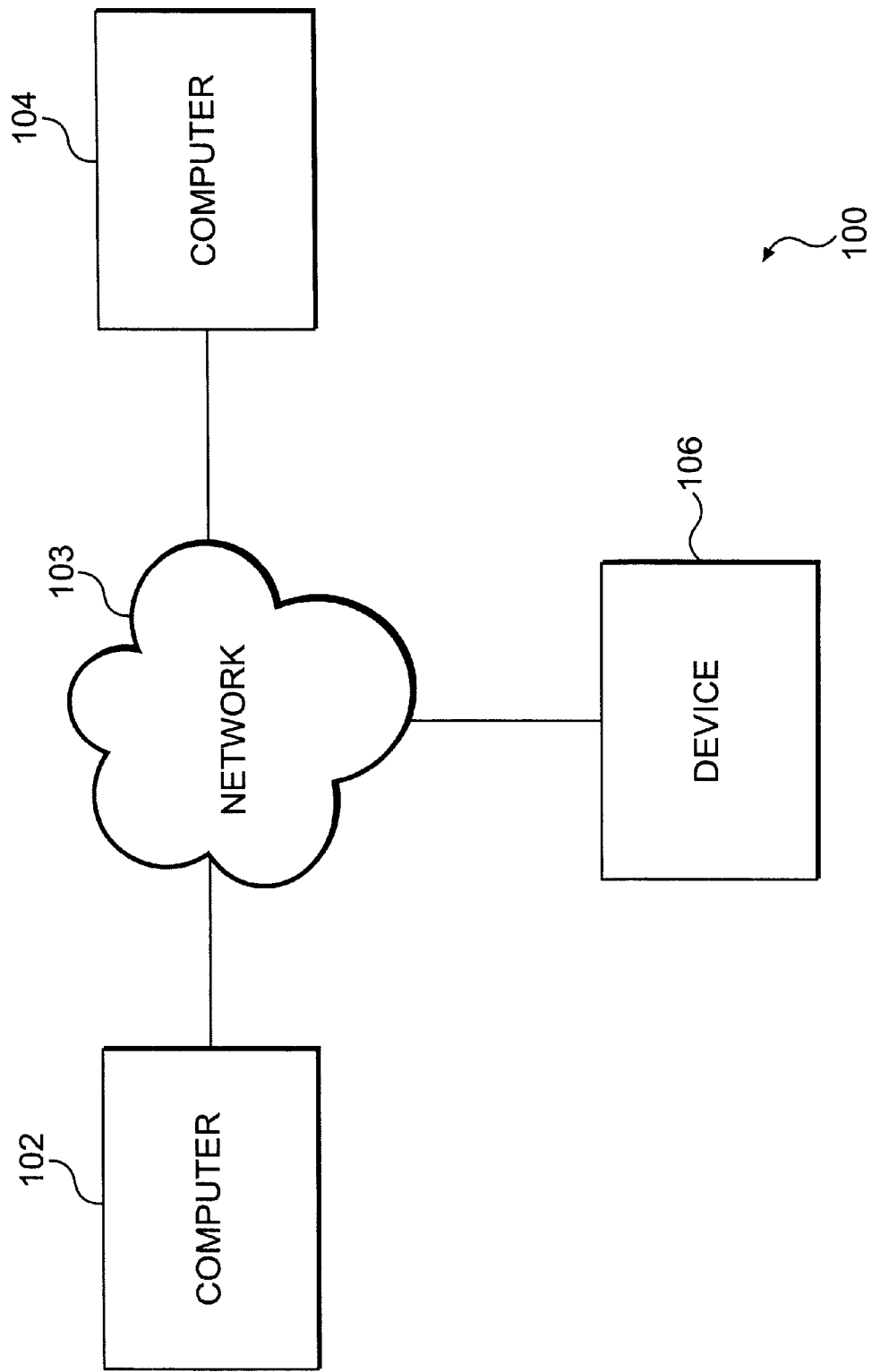
FIG. 1 illustrates an exemplary network architecture in which systems consistent with the present invention may be implemented.

Methods and systems consistent with the present invention operate in distributed systems comprised of, for example, multiple homogenous or heterogenous machines. An exemplary distributed system is shown in FIG. 1. This distributed system is generally comprised of various components, including both hardware and software. The exemplary distributed system (1) allows users of the system to share services and resources over a network of many devices; (2) provides programmers with tools and programming patterns that allow development of robust, secured distributed systems; and (3) simplifies the task of administering the distributed system. To accomplish these goals, the distributed system utilizes the Java™ programming environment to allow both code and data to be moved from device to device in a seamless manner. Accordingly, the distributed system is layered on top of the Java™ programming environment and exploits the characteristics of this environment, including the security offered by it and the strong typing provided by it. The programming environment is described more fully in Jaworski, Java 1.1 Developers Guide, Sams.net (1997), which is incorporated herein by reference.

In the exemplary distributed system, different computers and devices are federated into what appears to the user to be a single system. By appearing as a single system, the distributed system provides the simplicity of access and the power of sharing that can be provided by a single system without giving up the flexibility and personalized response of a personal computer or workstation. The distributed system may contain thousands of devices operated by users who are geographically disperse, but who agree on basic notions of trust, administration, and policy.

Within the exemplary distributed system are various logical groupings of services provided by one or more devices, and each such logical grouping is known as a Djinn. A "service" refers to resource, data, or functionality that can be accessed by a user, program, device, or another service and that can be computational, storage related, communication related, or related to providing access to another user. Examples of services provided as part of a Djinn include devices, such as printers, displays, and disks; software, such as applications or utilities; information, such as databases and files; and users of the system.

Both users and devices may join a Djinn. When joining a Djinn, the user or device adds zero or more services to the Djinn and may access any one of the services it contains. Thus, devices and users federate into a Djinn to share access to its services. The services of the Djinn appear programmatically as objects of the Java programming environment, which may include other objects, software components written in different programming languages, or hardware devices. A service has an interface defining the operations that can be requested of that service, and the type of the service determines the interfaces that make up that service.

Distributed system 100 shown in FIG. 1 is comprised of computer 102, computer 104, and device 106 interconnected by a network 108. Device 106 may be any of a number of devices, such as a printer, fax machine, storage device, or other devices. Network 108 may be a LAN, WAN, or the Internet. Although only two computers and one device are depicted as comprising distributed system 100, one skilled in the art will appreciate that distributed system 100 may include additional computers and devices or even computers alone without any devices.

Figure 2:
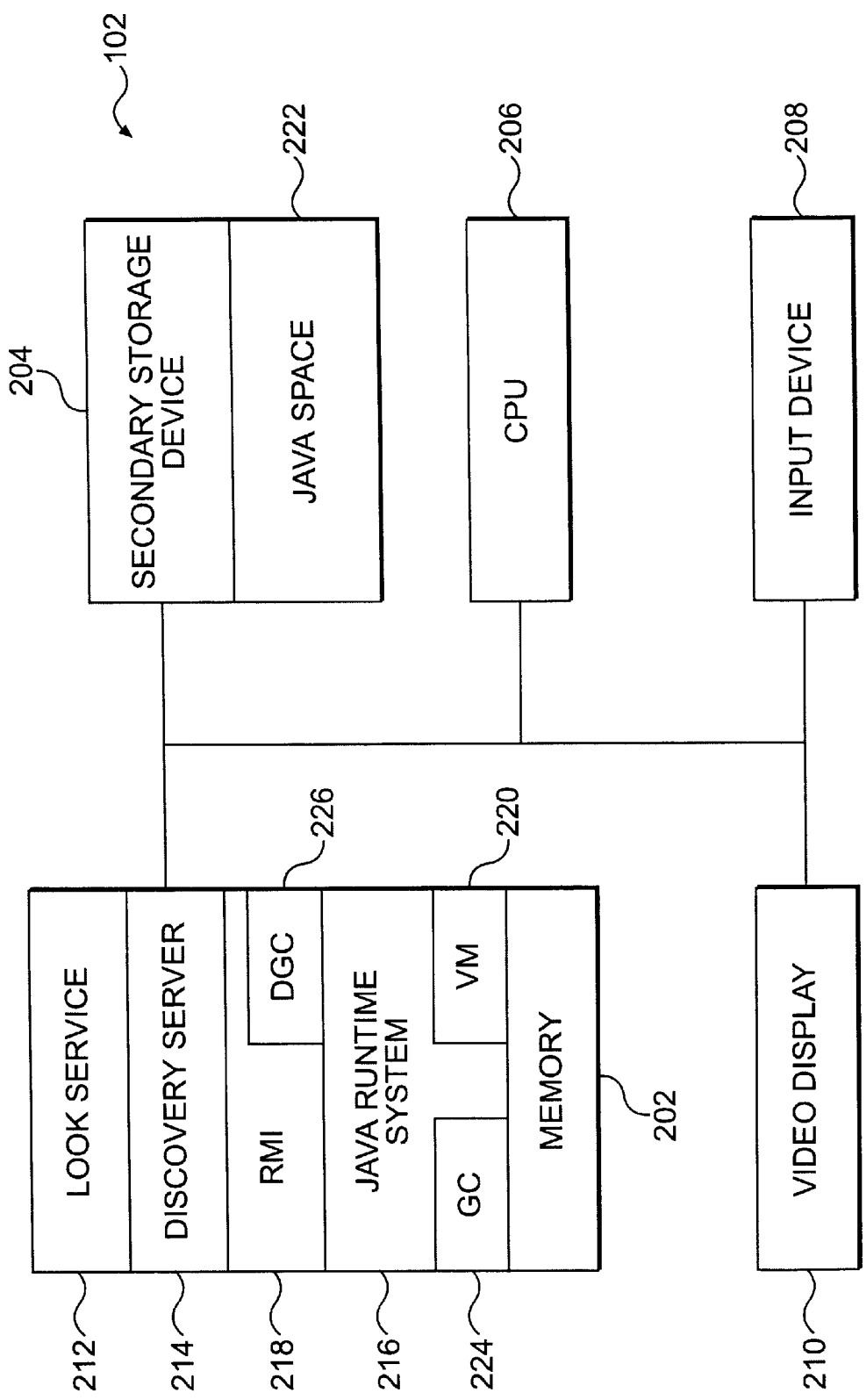
FIG. 2 is block diagram of an exemplary system architecture for a computer system with which the invention may be implemented.

FIG. 2 depicts computer 102 in greater detail to show a number of the software components of the distributed system 100. Computer 102 includes a memory 202, a secondary storage device 204, a central processing unit (CPU) 206, an input device 208, and a video display 210. Memory 202 includes a lookup service 212, a discovery server 214, an RMI 218, and a Java runtime system 216. Runtime system 216 includes a Java VM 220, and a garbage collector (GC) 224. Secondary storage device 204 includes a Java™ space 222.

As mentioned above, distributed system 100 is based on the Java programming environment and thus makes use of Java runtime system 216. Java runtime system 216 includes a Java™ API (not specifically shown), allowing programs running on top of Java runtime system 216 to access, in a platform-independent manner, various system functions, including windowing capabilities and networking capabilities of an operating system (not shown) associated with computer 102. Since the Java API provides a single common API across all operating systems to which the Java programming environment is ported, the programs running on top of a Java runtime system run in a platform-independent manner, regardless of the operating system or hardware configuration of the host platform. Java runtime system 216 is provided as part of the Java™ software development kit (JDK) available from Sun Microsystems of Mountain View, Calif.

The Java virtual machine 220 also facilitates platform independence. The Java virtual machine 220 acts like an abstract computing machine, receiving instructions from programs in the form of bytecodes and interpreting these byte codes by dynamically converting them into a form for execution, such as object code, and executing them. Garbage collector (GC) 224 implements a garbage collection process to manage memory resources. GC 224 generally determines when an object is no longer referenced and initiates a process to reclaim the associated memory resources based upon the result of this determination.

RMI 218 facilitates remote method invocation by allowing objects executing on one computer or device to invoke methods of an object on another computer or device. Both RMI and the Java virtual machine are also provided as part of the Java software development kit. RMI 218 includes a distributed garbage collector (DGC) 226, which implements a reference-counting garbage collection algorithm similar to Modula-3's Network Objects.

Lookup service 212 defines the services that are available for a particular Djinn. That is, there may be more than one Djinn and, consequently, more than one lookup service within distributed system 100. Lookup service 212 contains one object for each service within the Djinn, and each object contains various methods that facilitate access to the corresponding service. Lookup service 212 is described in greater detail in co-pending U.S. patent application Ser. No. 09/044,826, entitled "Method and System for Facilitating Access to a Lookup Service," which has been previously incorporated herein by reference.

Discovery server 214 detects when a new device is added to distributed system 100, during a process known as boot and join or discovery, and when such a new device is detected, the discovery server passes a reference to lookup service 212 to the new device so that the new device may register its services with lookup service 212 and become a member of the Djinn. After registration, the new device becomes a member of the Djinn, and as a result, it may access all the services contained in lookup service 212. The process of boot and join is described in greater detail in copending U.S. patent application Ser. No. 09/044,959, entitled "Apparatus and Method for providing Downloadable Code for Use in Communicating with a Device in a Distributed System," which has been previously incorporated herein by reference.

Java space 222 is an object repository used by programs within distributed system 100 to store objects. Programs use Java space 222 to store objects persistently as well as to make them accessible to other devices within the distributed system. Java spaces are described in greater detail in co-pending U.S. patent application Ser. No. 08/971,529, entitled "Database System Employing Polymorphic Entry and Entry Matching," assigned to a common assignee, filed on Nov. 17, 1997, which is incorporated herein by reference. One skilled in the art will appreciate that distributed system 100 may contain more than one lookup service, discovery server, and Java spaces.

Framework for Distributed Weak References

Figure 3:
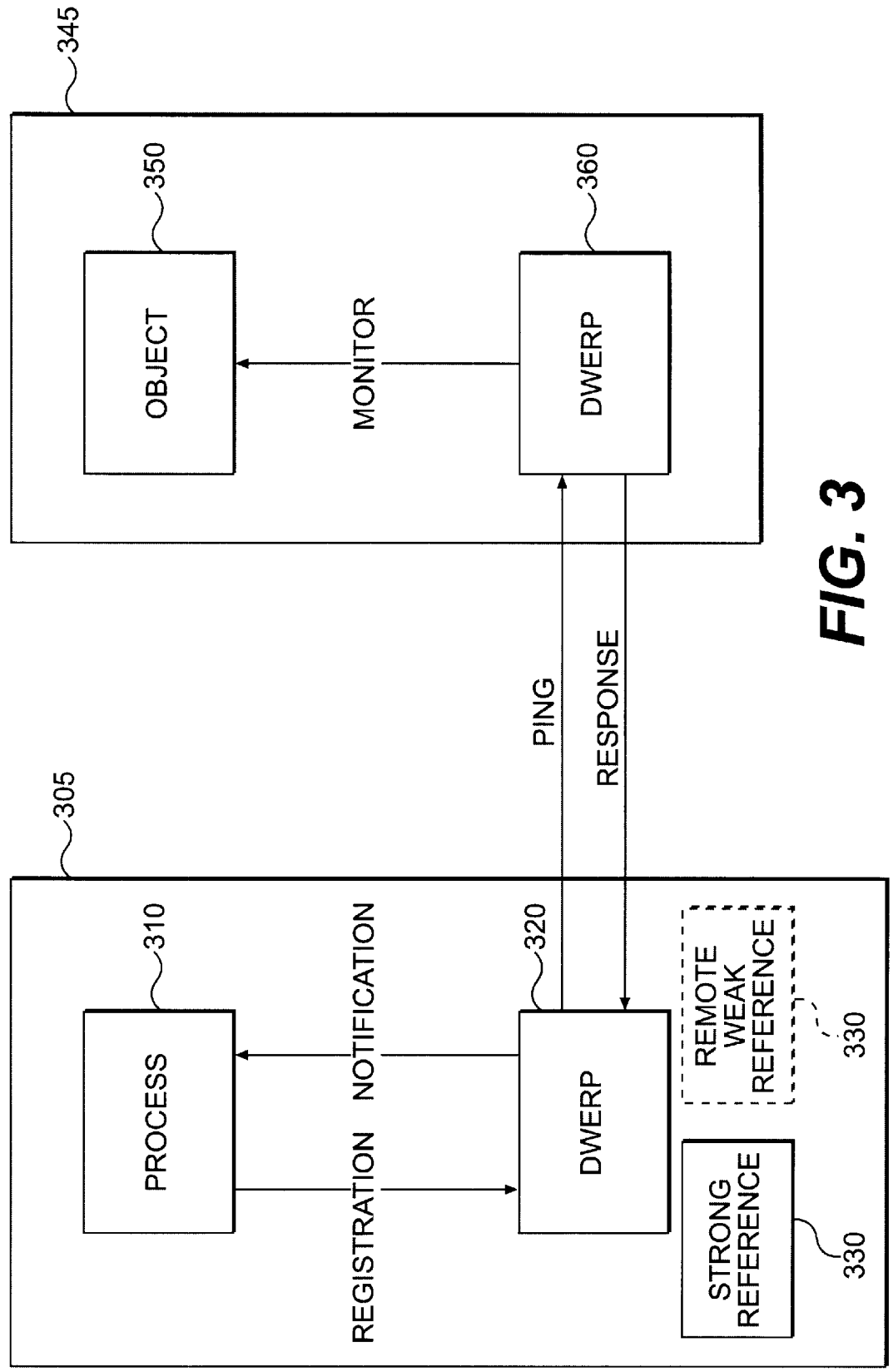
FIG. 3 is a block diagram illustrating a data flow for handling remote objects in a distributed system consistent with the present invention.

Referring now to FIG. 3, a framework for using remote weak references in a distributed system to implement a registration-notification process for remote objects consistent with the present invention will be explained. FIG. 3 shows two computers 305 and 345, which may correspond to computers 102 and 104 shown in distributed system 100. Each computer, 305 and 345, includes a Distributed WEak Reference Process (DWERP) 320 and 360, respectively, to implement the registration-notification process for remote objects. DWERP 320 and 360 may be implemented in program code written in, for example, the Java programming language, and stored in memory 202 as part of RMI 218.

For purposes of this explanation, computer 305 will be referred to as a client because it comprises a computational entity, shown as process 310, that references a remote object. In contrast, computer 345 will be referred to as a server because it comprises object 350, which constitutes a remote object with respect to process 310, which seeks status information on object 350 in this example. (The remote object may be located in Java space 222 of a distributed system conforming with the architecture shown in FIGS. 1 and 2.) Although this description refers to the client and server as corresponding to different physical computers, it is also possible to configure a single computer operate as both a client and server. For example, a physical machine can be partitioned to support separate virtual machines and corresponding address spaces for the client and server.

Process 310 is said to hold a "strong" reference 330 to object 350 when process 310 receives a reference to object 350. A "strong" reference may be used to invoke methods on or pass as a parameter or return value in an RMI call. Although process 310 holds a "strong" reference to object 350 in this example, it is also possible that another computational entity in the distributed system holds a "strong" reference to object 350, yet process 310 seeks notification as to a status associated with object 350. In either case, process 310 registers a request with DWERP 320 to receive notification of a change in the "liveness" of object 350.

DWERP 320 monitors for the occurrence of events that affect the "liveness" of object 350, and notifies the registered process 310 accordingly. In one implementation, process 310 is only notified when an event affecting the "liveness" of remote object 350 is detected, although other implementations may permit process 310 to receive periodic updates on a status of the remote object.

If a network partition prevents process 310 from accessing object 350, DWERP 320 provides an event notification to process 310 because process 310 registered to receive such a notification. Such a partition can occur as a result of either a loss of connectivity between client 305 and the distributed system or a loss of connectivity between server 345 and the distributed system. In the event of a partition on the client side, DWERP 320 simply detects the event and notifies process 310 of the event. In the case of a network partition on the server side or a change in the "liveness" of object 350 resulting from its reclamation during a garbage collection cycle on server 345, DWERP 320 must communicate with DWERP 360 of server 345 to obtain information concerning these types of events affecting the "liveness" of object 350.

To that end, DWERP 320 periodically sends a "ping" or status request to DWERP 360 of computer 345. As shown in FIG. 3, DWERP 360 receives the ping from DWERP 320. In this example, remote weak reference 340 is used to determine the location of DWERP 360 and object 350 on server 345. Note that the process of pinging computers associated with remote objects is done asynchronously with respect to the registration process.

DWERP 360 of server 345 monitors resident or local objects, including object 350. Note that the DGC of the RMI for server 345 maintains the list of references to "local" objects designated as remote objects for RMI calls. DWERP 360 uses this information to monitor the local objects.

Based on the status of a selected object(s) identified by a ping, the server's DWERP 360 returns an appropriate response. In this example, DWERP 360 returns a response to the ping from DWERP 320 indicating no change in the "liveness" associated with object 350. Since object 350 has not been garbage collected, and no network partition has occurred, the response from DWERP 360 in this example indicates that object 350 is still accessible. If, however, object 350 had been garbage collected by virtue of the fact that no more remote or local strong references to the object exist, the response from DWERP 360 would indicate such a status for object 350 in response to the ping from DWERP 320. In this case, DWERP 320 would notify process 310 of a change in the "liveness" of object 350 based on the response received from DWERP 360 of server 345. Thus, if the response indicates no change in the "liveness" of remote object 350, process 310 receives no event notification. In general, event notifications are provided only upon the occurrence and detection of an event changing the "liveness" of object 350.

As can be seen from the above discussion, the Distributed WEak Reference Process is comprised of two component functions. The first is a function performed on the client-side of a transaction and the second is a function performed on the server-side of a transaction. The client-side function of DWERP will be explained below with reference to the flow chart in FIG. 4 and the server-side function will be explained below with reference to the flow chart in FIG. 5.

Client-Side Function

Figure 4A:
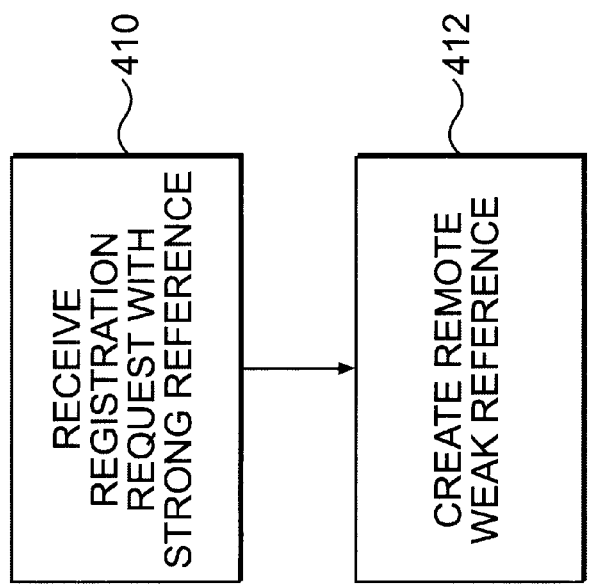
FIGS. 4A and 4B are a flow chart illustrating acts performed by a client-side function of a distributed weak reference process consistent with an implementation of the present invention.
Figure 4B:
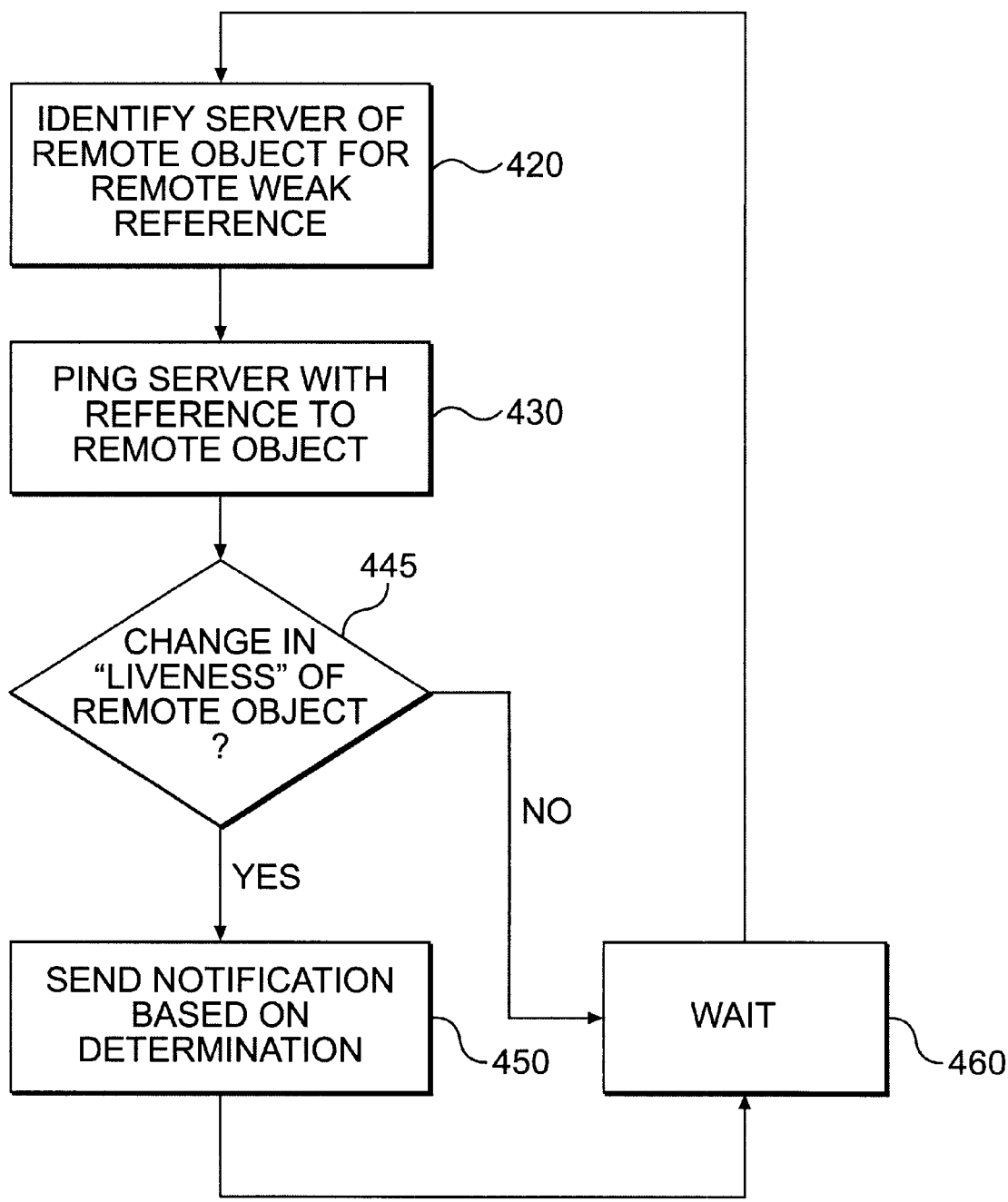

As shown in FIGS. 4A and 4B, the client-side function includes two aspects: registration and notification. The steps involved in registration are shown in FIG. 4A. First, the client-side DWERP receives a registration request from a computational entity that indicates that the entity wishes to receive a notification as to the status of a selected remote object (step 410). The request includes either a strong reference to the selected remote object or a pointer to a location where the strong reference is located. Client-side DWERP then registers the request by creating a remote weak reference to the selected remote object (step 412).

The notification aspect of the client-side DWERP is shown in FIG. 4B. Periodically, and not necessarily in sync with the registration aspect, the client-side DWERP accesses a set of remote weak references for remote objects to identify the location of any remote objects with corresponding notification requests from computational entities, i.e., the server for the remote object (step 420), and sends a ping to each identified server with information on the remote object for which a liveness update has been requested (step 430).

The client-side DWERP then determines whether there has been a change in the "liveness" of each remote object with a registered remote weak reference (step 445) and notifies the corresponding registered computational entity when such a change has occurred (step 450). If there has been no change in the liveness of a remote object (step 445), client-side DWERP returns to a wait state (step 460) where it remains until it is time for another ping cycle. In one cycle the client-side DWERP may simultaneously send pings to servers for all remote objects with registered remote weak references or it may use each cycle to send a ping to only one or a limited number of servers.

If, however, an event affecting the "liveness" of a remote object is detected, then the corresponding registered computational entity is provided a notification of the event (step 450). For example, if a network partition preventing the client from sending pings or receiving responses to pings has occurred, the client-side DWERP provides an event notification to one or more computational entities with registered requests to receive an event notification when an event affecting the "liveness" of a remote object has occurred. Similarly, the DWERP notifies computational entities when the DWERP does not receive a response to a ping (which indicates a communication problem with the server for a remote object), or when the server's DWERP responds with an indication that the remote object has been garbage collected.

In this manner, the client-side function handles the registration by computational entities for status on remote objects and the notification of those registered computational entities upon receipt of information on the status of selected remote objects.

Server-Side Function

Figure 5:
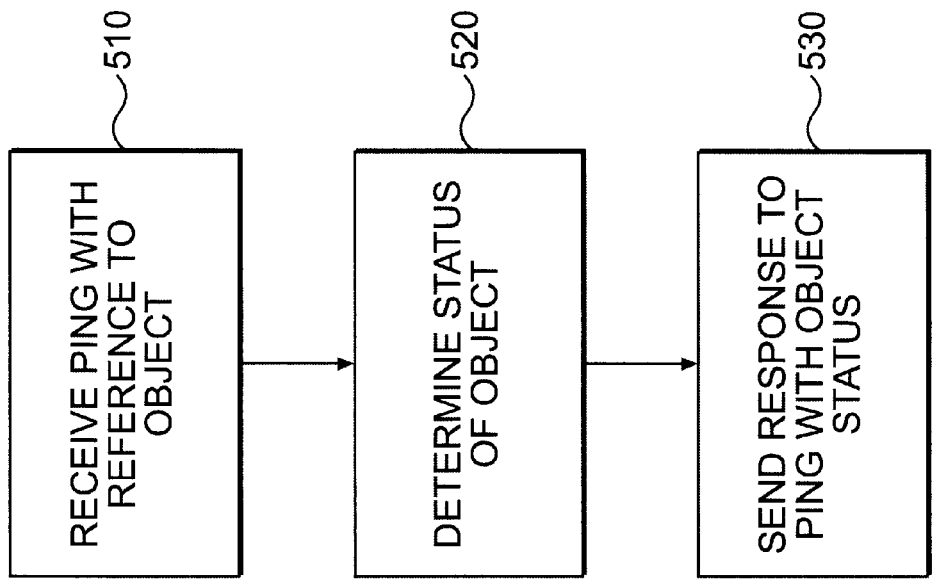
FIG. 5 is a flow chart illustrating acts performed by a server-side function of a distributed weak reference process consistent with an implementation of the present invention.

As shown in FIG. 5, the server-side function of the DWERP involves receiving each ping from a client machine (step 510), determining whether there has been a change in the "liveness" of an identified local object for the server, e.g., has the object been garbage collected (step 520), and sending a response, including any change in the "liveness" that object, to the client machine (step 530).

Although this description describes the client and server functions of a DWERP separately, those skilled in the art will recognize that both functions of a DWERP would likely be present on each machine in a distributed system to take full advantage of the concepts of the present invention.

Conclusion

Systems consistent with the present invention thus implement a methodology for determining a change in the liveness of remote objects in a distributed system. In summary, computational entities register requests to receive notification as to a change in the liveness of selected remote objects. Status requests on the remote object are periodically sent to the server where the remote object resides. The remote object is located using a remote weak reference to the remote object. Responses to the status requests are then provided to the registered computational entity based on the occurrence of an event that changes the liveness of the remote object. In this manner, computational entities can receive a notification as to a state change of remote objects.

The foregoing description of an implementation of the invention has been presented for purposes of illustration and description. It is not exhaustive and does not limit the invention to the precise form disclosed. Modifications and variations are possible in light of the above teachings or may be acquired from practicing of the invention. For example, the described implementation includes software but the present invention may be implemented as a combination of hardware and software or in hardware alone. The invention may be implemented with both object-oriented and non-object-oriented programming systems.

Although systems and methods consistent with the present invention are described as operating in the exemplary distributed system and the Java programming environment, one skilled in the art will appreciate that the present invention can be practiced in other systems and programming environments. Additionally, although aspects of the present invention are described as being stored in memory, one skilled in the art will appreciate that these aspects can also be stored on other types of computer-readable media, such as secondary storage devices, like hard disks, floppy disks, or CD-ROM; a carrier wave from the Internet; or other forms of RAM or ROM. The scope of the invention is defined by the claims and their equivalents.

What is claimed is:

1. A method for supplying a state change associated with remote objects in a distributed system comprised of multiple platforms, wherein computational entities maintain references indicating the location of objects within the distributed system, the method comprising:

providing an object resident on a first platform;

registering a request from a computational entity located on a second platform remote with respect to the first platform to receive an indication reflecting a state change associated with the object, wherein the registering step is performed by a processor operating in the second platform and includes:

receiving a strong reference to the object from the computational entity, and creating a remote weak reference corresponding to the object based on the received strong reference;

determining whether an event has occurred changing the state associated with the object;

locating the one of the platforms upon which the object resides based on the remote weak reference corresponding to the object;

sending a status request to the located platform; and providing a notification to the computational entity based on the determination.

2. A computer-readable medium containing instructions that perform a method, when executed by a processor, for supplying a state change associated with remote objects in a distributed system comprised of multiple platforms, wherein the method enables computational entities to maintain references indicating the location of objects within the distributed system, by:

providing an object resident on a first platform;

registering a request from a computational entity located on a second platform remote with respect to the first platform to receive an indication reflecting a state change associated with the object, wherein the registering step is performed by a processor operating in the second platform and includes:

receiving a strong reference to the object from the computational entity, and creating a remote weak reference corresponding to the object based on the received strong reference; and determining whether an event has occurred changing the state associated with the object;

locating the first platform upon which the object resides based on the remote weak reference corresponding to the object;

sending a status request to the located platform; and providing a notification to the computational entity based on the determination.

3. A system comprising:

a server system including an object; and a client system including:

a client process; and a remote weak reference process configured, when executed by a processor, to: receive, from the client process, a registration request for receiving an indication when a state associated with the object changes, the registration request including a strong reference to the object, create a remote weak reference to the object, identify the server system based on the remote weak reference, send a status request to the server system to determine whether the state associated with the object changes, and provide, to the client process, a notification indicating a change in the state associated with the object based on the determination.

4. The system of claim 3, wherein the notification is provided to the client process only when it is determined the state associated with the object has changed.

5. The system of claim 3, wherein the remote weak reference process accesses an address space associated with the object to determine whether the state associated with the object changed.

6. The system of claim 5, wherein the remote weak reference process determines that the state associated with the object has changed when a network partition separates an address space associated with the computational entity and the address space associated with the object.

7. The system of claim 3, wherein objects have corresponding references indicating their address space within the distributed system, and wherein the remote weak reference process is configured to determine whether the state associated with the object changes by locating an address space associated with the object based on a reference corresponding to the object and accessing the address space associated with the object.

8. The system of claim 3, wherein the remote weak reference process is configured to receive a liveness notification when the state associated with the object has changed.

* * * * *